US006116815A

United States Patent [19]
Chen

[11] Patent Number: 6,116,815
[45] Date of Patent: Sep. 12, 2000

[54] PROCESS FOR PREVENTING RELEASE OF CONTAMINATION FROM AN UNDERGROUND STORAGE TANK FIELD

[76] Inventor: Youzhi Chen, 150 Hidden Cir., Richardson, Tex. 75083

[21] Appl. No.: 08/775,961

[22] Filed: Jan. 3, 1997

Related U.S. Application Data

[60] Provisional application No. 60/009,662, Jan. 5, 1996.

[51] Int. Cl.[7] .............................. E02B 13/00; A62D 3/00
[52] U.S. Cl. ........................... 405/52; 405/128; 588/249; 210/747; 210/170
[58] Field of Search .............................. 405/52, 128, 129, 405/270; 166/50; 588/249; 210/170, 747; 364/551.01, 552; 340/632, 635, 648

[56] References Cited

U.S. PATENT DOCUMENTS

| | | | |
|---|---|---|---|
| 4,166,709 | 9/1979 | Valiga | 588/259 |
| 4,483,641 | 11/1984 | Stoll | 588/259 X |
| 4,850,745 | 7/1989 | Hater et al. | 405/128 X |
| 4,934,866 | 6/1990 | Gage | 405/270 X |
| 5,067,852 | 11/1991 | Plunkett | 405/258 X |
| 5,114,497 | 5/1992 | Johnson et al. | 405/128 X |
| 5,169,263 | 12/1992 | Johnson et al. | 405/128 |
| 5,193,934 | 3/1993 | Johnson et al. | 405/128 |
| 5,279,740 | 1/1994 | Basile et al. | 405/128 X |
| 5,286,140 | 2/1994 | Mather | 210/747 X |
| 5,384,048 | 1/1995 | Hazen et al. | 405/52 X |
| 5,421,671 | 6/1995 | Lewis | 405/52 |
| 5,435,666 | 7/1995 | Hassett et al. | 405/128 |
| 5,480,549 | 1/1996 | Looney et al. | 210/747 X |
| 5,553,974 | 9/1996 | Nazarian | 405/128 |
| 5,588,490 | 12/1996 | Suthersan et al. | 405/128 X |
| 5,615,978 | 4/1997 | Kotani et al. | 405/129 X |

FOREIGN PATENT DOCUMENTS

| | | | |
|---|---|---|---|
| 405033326 | 2/1993 | Japan | 588/249 |

*Primary Examiner*—Tamara L. Graysay
*Assistant Examiner*—Jong-Suk Lee
*Attorney, Agent, or Firm*—Ware, Fressola, Van Der Sluys & Adolphson LLP

[57] ABSTRACT

A system for preventing release from an underground storage tank from further migrating into surrounding geological formations and groundwater of a surrounding underground storage tank field includes a low permeable layer surrounding the tank field and a set of horizontal pipes positioned above and below the underground storage tank above the low permeable layer within underground storage tank field. The horizontal pipes include two portions including a lower portion installed below the underground storage tanks and an upper portion installed above the underground storage tanks. An air blower injects air in the lower portion of the horizontal pipes for providing air flow which passes through the formation of the underground storage tank to strip out volatile and semi-volatile components of any release from the underground storage tanks when there is a small release from the underground storage tanks. Free products released from the underground storage tanks are collected in the lower portion of the horizontal pipes. Air flow and vapor of the volatile and semi-volatile components is collected in the upper portion of the horizontal pipes when the lower portion of the horizontal pipes is used to provide air flow.

12 Claims, 7 Drawing Sheets

PROCESS FOR PREVENTING RELEASE OF CONTAMINATION FROM AN UNDERGROUND STORAGE TANK FIELD

This case claims benefit of provisional application 60/009,662 filed Jan. 5, 1996.

FIELD OF INVENTION

The present invention relates to a system for installation in a tank field to limit the hydraulic connection between the tank field and surrounding geological formations so that the possible release from a tank and/or a pump island located in the tank field is efficiently removed before it migrates into the surrounding soil, ground water and/or geological formations.

DISCUSSION OF BACKGROUND

Release from underground storage tanks (UST) is one of the most common contamination sources. Most of the Non-aqueous Phase Liquids (NAPLs), which are the main content of an UST release, are restricted by law and regulation to a very low concentration in drinking water due to its hazardous nature. Even a very small amount of NAPLs in the groundwater can pose a serious risk to the environment. For example, one gallon of gasoline, which contains about two percent benzene, can contaminate up to one million gallons of groundwater over the drinking water standard. Remediation of such contamination is very costly, time consuming and, worst of all, very inefficient in most of cases. Considering the number of USTs throughout the world, the millions of dollars spent every year to deal with UST contamination is not sufficient to deal with every UST.

For various reasons, it is very difficult to make an underground storage tank completely free from release. For over 20 years, various regulations have been imposed on the manufacture and installation of USTs. However, it has been found that the release from USTs still contaminates groundwater and surrounding aquifer formations, even if the UST meets all of the requirements set forth in regulations and passes all of the accompanying test. Under these circumstances, it is better to shift the focus from preventing an UST from leaking to keeping any possible leakage from contaminating groundwater and surrounding geological formations.

SUMMARY OF THE INVENTION

An object of the present invention is to provide a system for preventing release from an underground tank from contaminating surrounding soil, groundwater and/or other geological formations.

A further object of the present invention is to provide a system for removing the release of an underground tank or pump island located in a tank field.

Another object of the present invention is to provide a system for preventing release of an underground tank that stores chemicals mainly comprised of volatile or semi-volatile components from contaminating surrounding soil, groundwater or and/or other geological formations.

A still further object of the present invention is to provide an air circulation system to volatilize volatile and semi-volatile components from groundwater and surrounding geological formations in a tank field when the contamination with the volatile and semi-volatile components is released from an underground storage tank or pump island located in the tank field.

According to the present invention, a system for preventing release from an underground storage tank from further migrating into surrounding geological formations and groundwater of a surrounding underground storage tank field includes a low permeable layer and a set of horizontal pipes positioned above and below the underground storage tank above the low permeable layer within underground storage tank field. The horizontal pipes include two portions including a lower portion installed below the underground storage tanks and an upper portion installed above the underground storage tanks. An air blower injects air in the lower portion of the horizontal pipes for providing air flow which passes through the formation of the underground storage tank to strip out volatile and semi-volatile components of any release from the underground storage tanks when there is a small release from the underground storage tanks. Free products released from the underground storage tanks are collected in the lower portion of the horizontal pipes. Air flow and vapor of the volatile and semi-volatile components is collected in the upper portion of the horizontal pipes when the lower portion of the horizontal pipes is used to provide air flow.

The foregoing and other objects, features and advantages of the present invention will become more apparent in light of the following detailed description of exemplary embodiments thereof, as illustrated in the accompanying drawing.

DETAILED DESCRIPTION OF THE INVENTION

Figure 3:
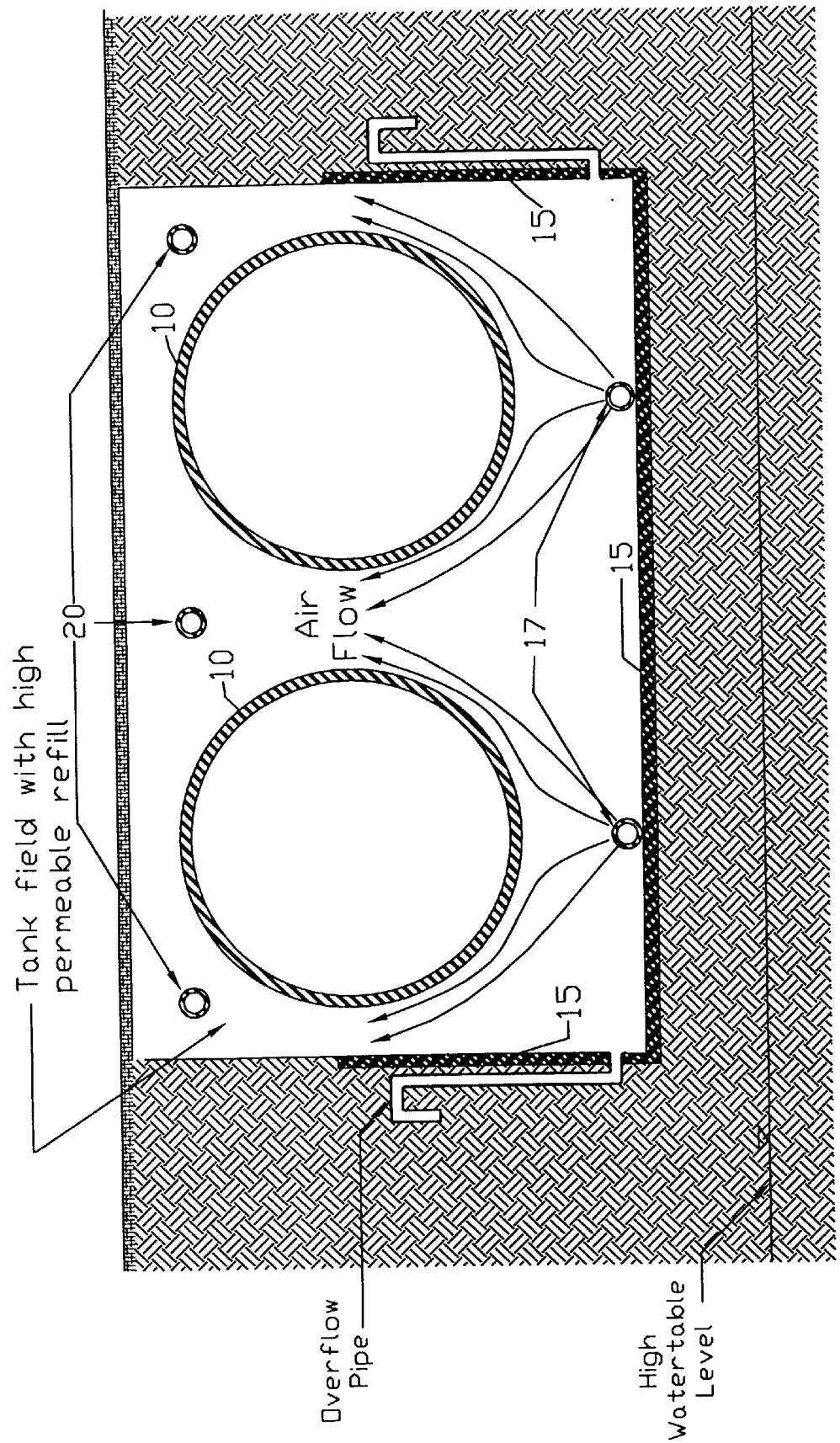
FIG. 3 is a cross-sectional side view taken along line 2—2 of FIG. 1, which illustrate a second embodiment of the invention with the system of the invention positioned above the water table of groundwater.
Figure 4:
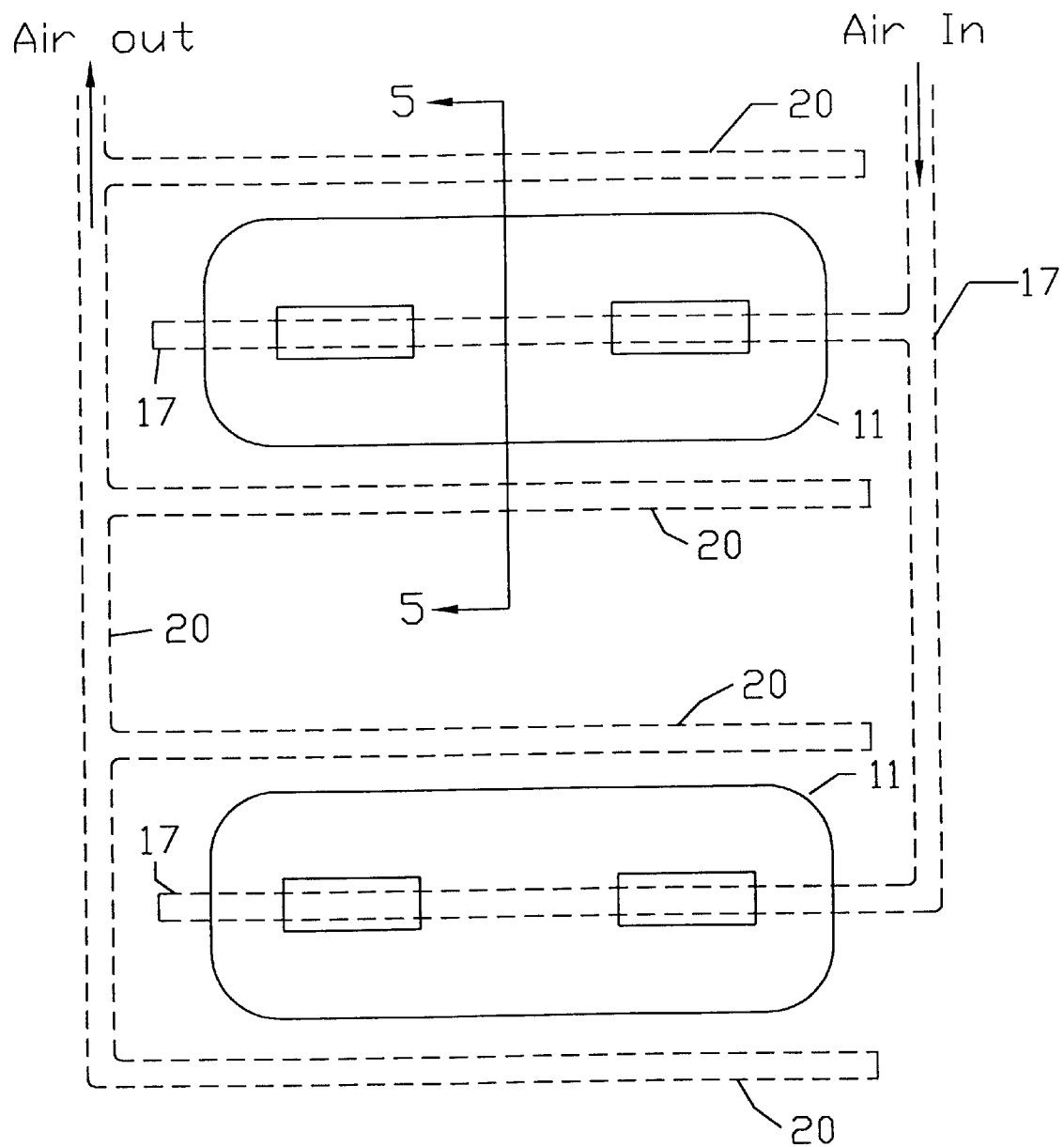
FIG. 4 is a top plan view of a pump island having the system of the invention.
Figure 5:
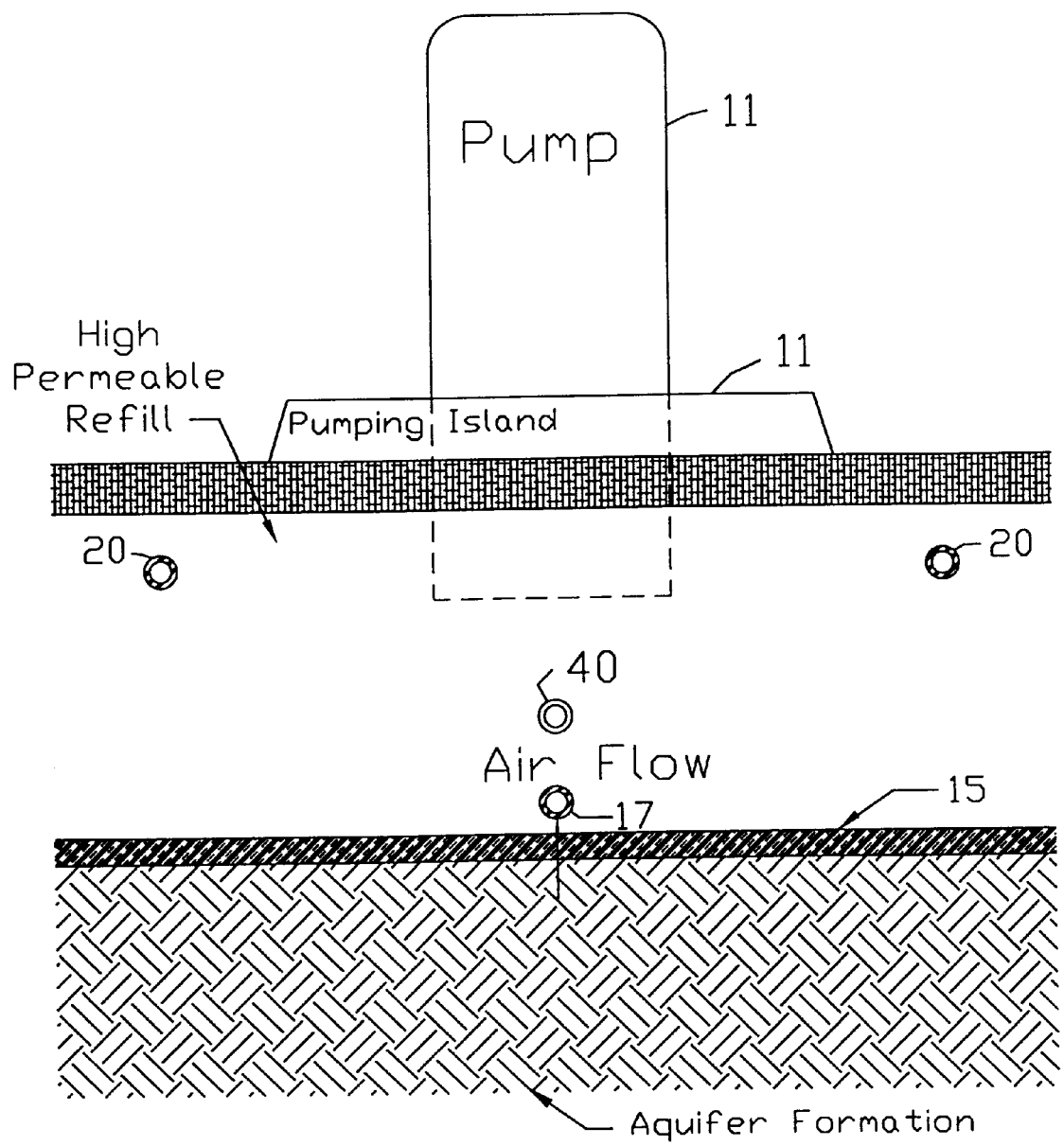
FIG. 5 is a cross-sectional side view taken along line 5—5 of FIG. 4, which illustrates the invention under the pump island.

The system of the present invention is particularly well suited for containing and removing the release of contamination from an underground storage tank field. Such an underground storage tank field may include one or more USTs 10 (FIGS. 1, 2, 3) and/or one or more pump islands 11 (FIGS. 4, 5).

Referring to FIGS. 1–5, the system includes a layer of low permeable materials 15 located at the sidewall and/or bottom of the tank field to isolate any possible release from the tanks 10 and to reduce the hydraulic link of the tank field with surrounding geological formations.

The low permeable material 15 should be made of a suitable material for providing a hydraulic barrier and be able to contain liquid in a given area. For example, the low permeable material may be clay, a plastic sheet, a suitably modified textile fabric or any other suitable material for providing a hydraulic barrier and able to contain liquid. A set of horizontal pipes 17 is installed below the USTs 10 and pump islands 11 either to collect possible release or to provide sufficient air flow to volatilize the release from the underground storage tanks. Another set of horizontal pipes 20 is installed above the tanks 10 to extract the volatile components when the bottom set of pipes 17 are used as air diffusers.

Figure 1:
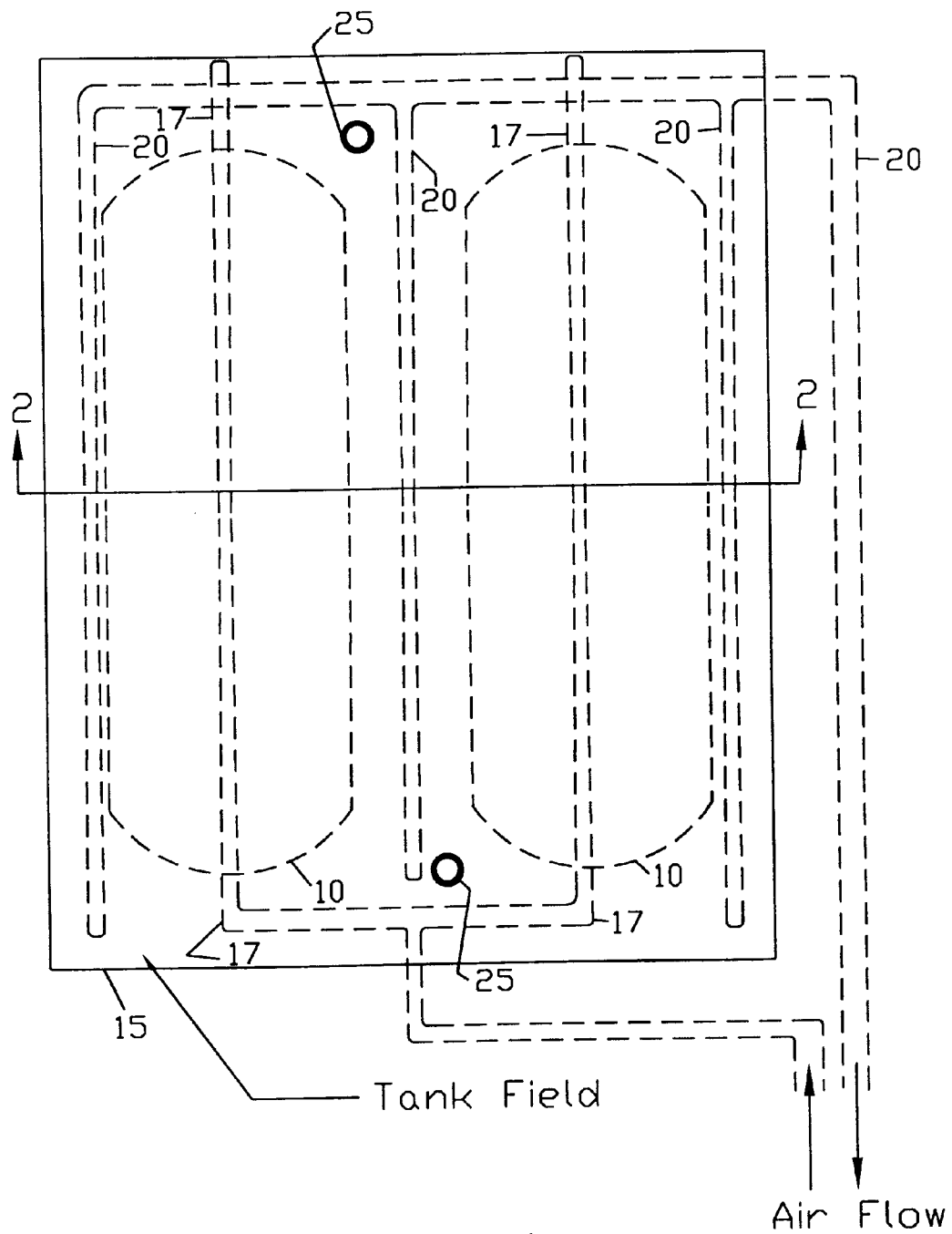
FIG. 1 is a top plan view of a tank field having the system of the invention.
Figure 2:
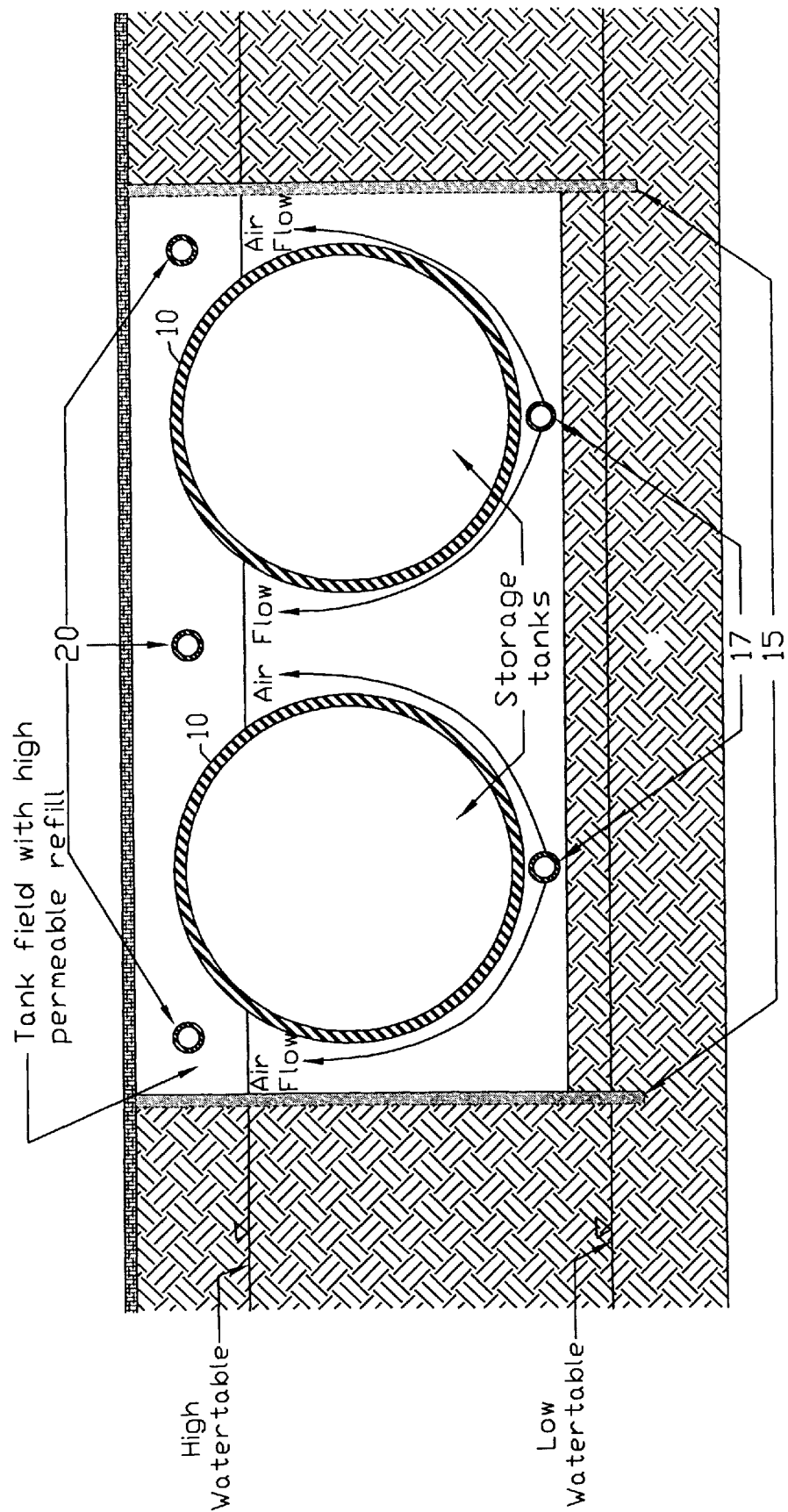
FIG. 2 is a cross-sectional side view taken along line 2—2 of FIG. 1, which illustrate the system of the invention positioned below the water table of groundwater.

Referring FIG. 4 and 5, the system of the invention can also be installed below pump islands 11. The system illustrated in FIGS. 4 and 5 may be used to collect a release in the tank field and/or the bottom of a pump island. The system can also be used for air stripping in case a release occurs. The system will prevent any release from accumulating and migrating into surrounding geological formations and groundwater. In the example of FIGS. 4 and 5, a product line 40 is used to provide a compound, such as gasoline, to the pumps of the pump island 11. As described herein after, the system of the present invention is installed with respect to the product line 40 in the same way it is installed with respect to an UST as illustrated in FIGS. 1, 2 and 3, for collecting any release from the pump or product line.

The system of the invention is installed at the same time the tank field and pump islands are being built. The system can be set up at the best position possible to achieve the highest efficiency. By installing the system in this manner, the installation cost will be minimized because of very little extra work associated with the system installation.

The low permeable materials 15 are used as a barrier to restrict the hydraulic link between groundwater in the tank field and the groundwater in the surrounding aquifer. The system of the invention may be installed with observation wells 25. The hydraulic barrier formed by the low permeable materials 15 concentrates any release in the tank field. This release is then easily detected in the observation wells.

The horizontal pipes 17 at bottom of the tank field can collect the constrained release efficiently if a spill occurs. The limited hydraulic connection will also eliminate the possibility of uncontrolled groundwater flow, which may carry the contaminants into the aquifer formation.

For example, the infiltration of the precipitation accumulated in the tank field may overflow when the tank field has been completely isolated from the aquifer formations. If there are free products floating on the water table surface, any overflow may carry the free products, thereby allowing migration into surrounding geological formations and groundwater. Furthermore, the significant hydraulic gradient at the low permeable boundaries, when there is complete hydraulic isolation, produces a risk of leaking. Under such circumstance, a restricted hydraulic connection is used to contain the possible contamination in the tank field.

Referring to FIG. 2, when the bottom of the tanks are installed below the water table, the low permeable material 15 will encircle the tank field and extend below the lowest water table level. The groundwater between the tank field and surrounding aquifer is hydraulically connected through the bottom of the tank field. In other words, the groundwater will flow into the tank field when the water table rises and flow out of the tank field if the water table declines. In the area where the highest water table level is far below the bottom of the tank field, as shown in FIG. 3, the low permeable layer will cover the bottom of the tank field and at least a lower part of the tank field wall. The low permeable bottom and sidewalls are designed to hold any water while it may infiltrate from the surface. To keep the water in the tank field from overflowing, a set of overflow pipes are installed at bottom of the tank field. The overflow pipes will provide the hydraulic link between the bottom of the tank field and the surrounding aquifer formation. When the water accumulated in the tank field reaches the top of the overflow pipe, it will flow out from bottom of the tank field through the overflow pipe. Because the NAPLs are lighter than water, the water surface in the tank field becomes a first barrier to hold the contamination from further migrating down to deeper aquifer formations.

Because of the low permeable layer, the amount of groundwater exchanged between the tank field and surrounding aquifer formation is very limited. In case there is free phase product in the tank field, the low permeable materials and the groundwater in the tank field can also restrain it from migrating into groundwater and surrounding geological formation. A tank field with dimension of 40 ft by 50 ft and a high water table, which means the contaminated groundwater has to be sparged, is used as an example because it is much easier to vent the free phase in an unsaturated zone than to sparge contaminated groundwater. In the tank field, the exchange of groundwater between the tank field and surrounding aquifer formation will be no more than four hundreds gallons when the water table has one inch fluctuation. By general industrial standard, over 99 percent of the volatile components will be removed if the ratio of air to water is over 25 and the amount of dissolved Lighter than water non aqueous phase (LNAPLs) in the water is moderate. Even for a small air blower with air flow rate of ten cubic feet per minute (CFM), the ratio of air to water in the tank field can be easily over 200. Such a high ratio of air to water will assure removing sufficient volatile components as well as semi-volatile components such as methyl tert-butyl ether (MTBE) from groundwater. When a higher safety factor is needed, it is easy to increase the air flow to 20 or even 50 CFM. Under such circumstance, it is guaranteed that the groundwater and geological formation are clean when there is some release in the tank field.

Because the refill under the pump island is shallow and the release from the product line and pump island will be much less than from tank field, the system will use smaller air sparging and vapor recovery pipes. The low permeable layer 15 can be laid flat under the pump island 11 because the shorter vertical migration path will limit the possibility of far reaching horizontal migration of the release.

Figure 6:
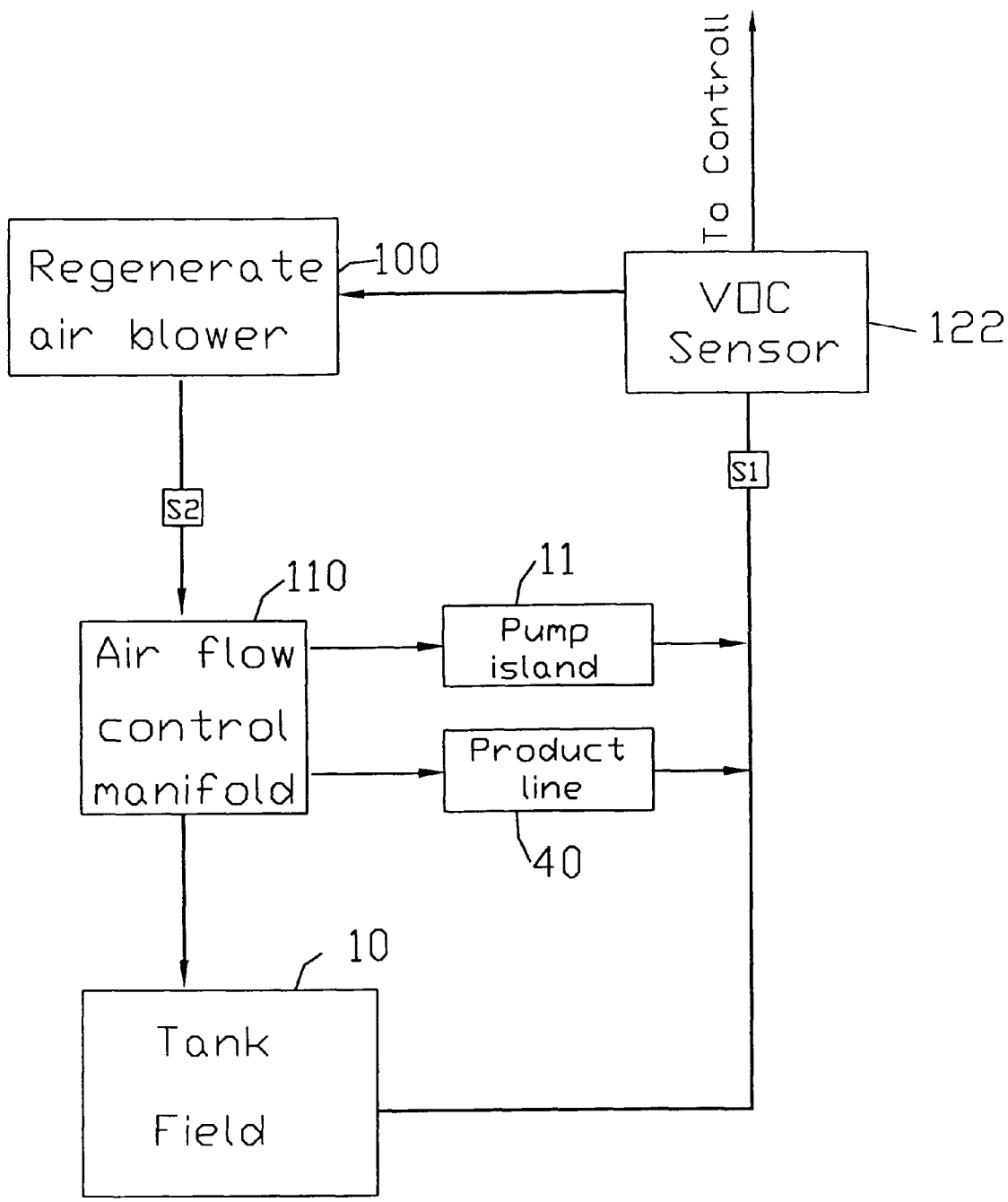
FIG. 6 is a schematic flow chart showing air flow in the system of the invention.

FIG. 6 shows the flow chart of a closed circulating air flow, which is used to prevent the air carrying vapor of volatile and semi-volatile components from contaminating the atmosphere. A regenerate air blower 100 blows air into a main air conduit. Then, a flow rate control manifold 110 will distribute the air flow to the pump island and the tank field at a desired rate. The control device can be a needle valve or a flow restricting ring installed in the air conduit. The air released in the tank field and under the pump islands will be collected by the recovery pipes in the two locations, respectively. Active carbon filters (not shown) may be set up in the main recovery conduit. These carbon filters clean up the vapor in the recovered air. A separate air blower and extractor, however, can also be used whenever it is necessary. The carbon filter may be located at the outlet of the air blower. Alternatively, the carbon filter may be located at the inlet of the air blower. Multiple carbon filters may be provided in various locations in the system.

Additionally, check valves may be located in the pipes to keep water from entering the carbon filters and air blower if the pipes become flooded.

Whenever it is necessary to use the system is for extracting liquid phase contamination, the liquid, which may be the groundwater or the release form the tanks, will flow in the direction against the air flow direction. In general, the liquid withdrawn from the tank field will not be reinjected into the tank field again.

Figure 7:
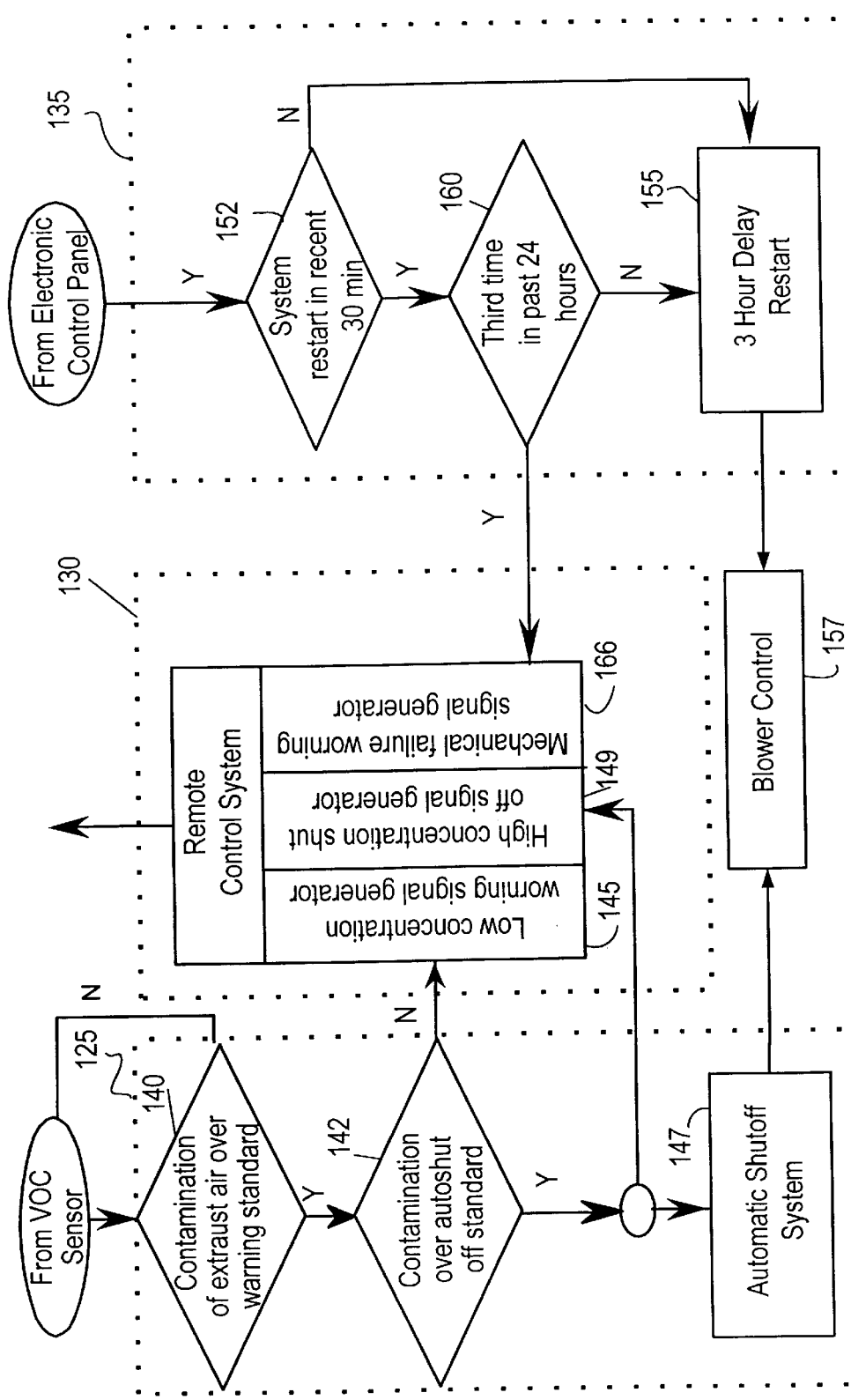
FIG. 7 is a logic flow diagram of a control system of the invention.

To assure that the system of the invention is running in an environmentally and mechanically safe condition, an automatic monitoring system is used to monitor the exhaust air. The monitoring system automatically shuts down the blower 100 under certain operational conditions. Referring to FIGS. 6 and 7, the automatic monitoring system consists of three logic monitoring modules, exhaust air monitoring module 125, mechanical shutoff monitoring module 135 and a remote control system module 130, respectively.

The exhausting air monitoring module consists of a VOC (volatile organic component) sensor 122 installed on the exhaust pipe (FIG. 6). The VOC sensor 122 provides information to the exhaust air monitoring module 125 (FIG. 7). The VOC sensor is used to measure the concentration of volatile organic components in the exhaust air. Based on the concentration of the VOC, the exhaust air monitoring module 125 will make the remote control system 130 generate two kinds of signals indicating the status of the exhaust. The signals include a low concentration warning and a high concentration shutoff, respectively. Under normal operation status, the concentration of the VOC in the exhausting air is below a certain monitoring level as checked in a test 140, and no action is taken because there is no leakage or no noticeable leakage in the tank field. However, if the contamination level exceeds a minimum warning standard as checked in the test 140, a test 142 is reached wherein the system checks if the contamination is over an automatic shutoff level. If the results of the test 142 are negative, status of the low concentration warning indicates that there may be some leakage in the tank field and the remote control system 130 provides a low concentration warning signal 145. Since the system is designed to deal with a small amount leakage in the tank field, no action will be necessary unless the status lasts for a significant time period. Under such circumstances, it is a strong indication that some small but permanent damage may exist on either the tanks or the production lines and repair work is needed.

If the results of the test 142 are positive, there is a high level concentration of VOC in the exhaust air indicating that significant leakage or a spill is occurring or has occurred in the tank field and immediate action must be taken. Because the normal operation of the system can not deal with a large amount of contamination in the tank field, the system will be automatically shut off in a step 147 to avoid releasing too much contamination into the atmosphere and a high concentration shut off warning 149 is given by the remote control system 130. In the meantime, an emergency responding team can be sent out to modify the system and start cleanup.

The mechanical condition monitoring system 135 is used for monitoring the operating status of the blower or the blowers in the system. It consists of two sets of timing circuits, a set of delay restart circuits and a set of counter circuits. Due to natural causes such as overheating or pressure change, the blower 100 (FIG. 6) may stop working from time to time. Under such circumstances, the blower can be restarted in normal operation after a few hours of cooling time. To assure the blower is operational under minimum personal attention, the blower will be restarted after a three-hour delay. Two sets of timing circuits and a set of counter circuits are designed to avoid fruitless restart when there is real mechanical failure. The blower will be considered to be a failure when it cannot keep running more than 30 minutes after restart and such restart happens three times in any given 24 hour period. Then a mechanical failure signal will be sent out. In the meantime, the control system will stop restarting the blowers.

Referring to FIG. 7, if the fan is shut down, a test 152 is performed wherein the system checks if the blower has been restarted in the last 30 minutes. If the results of the test 152 are negative, a step 155 is reached wherein the restart is delayed for 3 hours. The blower is then restarted in a step 157. If the results of the test 152 are positive, a test 160 is reached wherein the system checks if the system has attempted to restart the blower within 30 minutes of a previous restart at least three times in the past 24 hours. If the results of the test 160 are negative, the system reaches the step 155. However, if the results of the test 160 are positive, a failure is determined and a mechanical failure warning 166 is given by the remote control system.

The system of the invention is described herein as controlling the release of contamination from a tank field or a fuel pump island. However, it will be understood by those skilled in the art that the principles of the present invention are equally applicable to any point source of potential contamination (such as a tank, pump, supply line, etc.) and a desire to contain and remove any contamination from a designated containment area (tank field, etc). The containment area is defined by the placement of the low permeability material which is placed to contain contamination in a specified containment area.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. A process for preventing release of contamination from a source of potential contamination in a containment area from migrating into surrounding geological formations and groundwater outside of the containment area, the process including the steps of:

providing a layer of low permeable material defining the containment area, said lower permeable layer of material providing a hydraulic barrier between the containment area and the surrounding geological formations and groundwater;

providing a first set of pipes, in fluid communication with the containment area, horizontally positioned below said source of potential contamination in the containment area;

providing a second set of pipes, in fluid communication with the containment area, horizontally positioned above said source of potential contamination in the containment area;

injecting air in said first set of pipes for providing air flow which passes through said containment area to strip out volatile and semi-volatile components of the contamination;

collecting said air flow and vapor of said volatile and semi-volatile components in said second set of pipes; and collecting free product contamination in said first set of pipes when said contamination is of a significant amount.

2. A process as claimed in claim 1, further comprising the step of monitoring a contamination level of the contamination, for providing a contamination level signal.

3. A process as claimed in claim 2, wherein said step of monitoring includes monitoring for volatile organic components.

4. A process as claimed in claim 2, further comprising the steps of:

monitoring said contamination level signal, for providing a low concentration warning signal when said contamination level signal indicates contamination exceeding a first threshold value and for providing a high concentration warning signal when said contamination level signal indicates contamination exceeding a second higher threshold value;

monitoring at least one blower used to perform the step of injecting air into said first set of pipes, and providing a mechanical failure warning signal responsive to failure of said at least one blower;

providing a low concentration warning in response to said low concentration warning signal;

providing a high concentration warning in response to said high concentration warning signal; and providing a mechanical failure warning in response to said mechanical failure warning signal.

5. A process as claimed in claim 1, wherein said layer of low permeable material includes a material that is able to contain liquid in the containment area.

6. A process as claimed in claim 5, wherein said layer of low permeable material is selected from the group consisting of clay, plastic sheet, and special textiles made for providing a hydraulic barrier in the geological formation.

7. A process as claimed in claim 5, wherein said layer of low permeable material covers at least part of side wall surfaces of the containment area.

8. A process as claimed in claim 5, wherein said layer of low permeable material covers at least a bottom surface of the containment area.

9. A process as claimed in claim 5, wherein said layer of low permeable material covers at least part of side wall surfaces and a bottom surface of the containment area.

10. A process as claimed in claim 1, wherein said source of potential contamination is a storage tank.

11. A process as claimed in claim 1, wherein said source of potential contamination is a product line.

12. A process as claimed in claim 1, wherein said source of potential contamination is a pump island.

* * * * *